July 17, 1923.
F. J. MINER
UNIVERSAL CONDUIT BOX
Filed Jan. 27, 1919
1,462,209
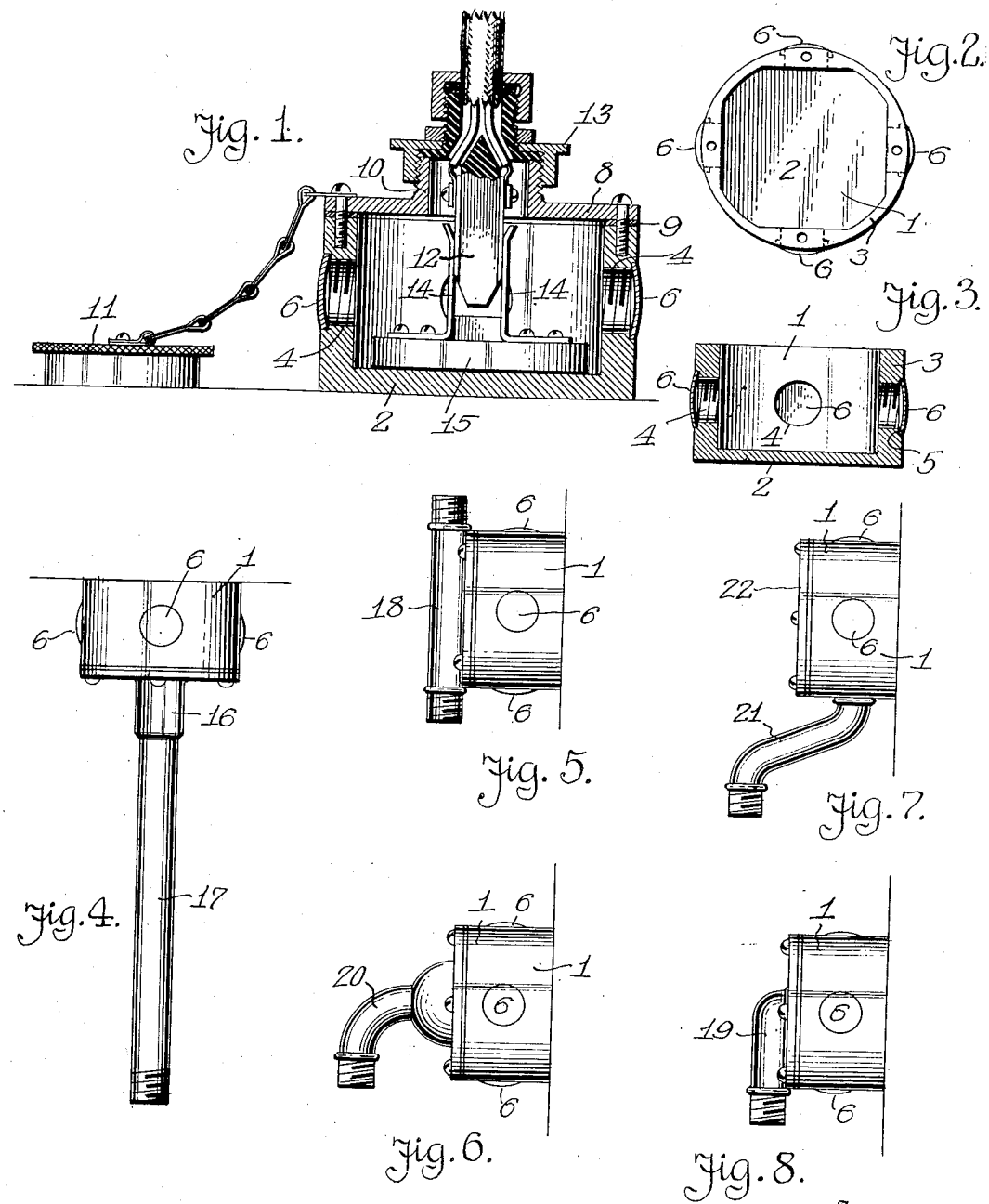

Patented July 17, 1923.

1,462,209

UNITED STATES PATENT OFFICE.

FRANK J. MINER, OF DETROIT, MICHIGAN.

UNIVERSAL CONDUIT BOX.

Application filed January 27, 1919. Serial No. 273,294.

*To all whom it may concern:*

Be it known that I, FRANK J. MINER, a citizen of the United States, residing at Detroit, in the county of Wayne and State of Michigan, have invented a new and useful Improvement in Universal Conduit Boxes, of which the following is a specification, reference being had therein to the accompanying drawing.

This invention relates to electrical wiring installations and more particularly to a water-tight unit especially adapted for marine work.

The object of the invention is to provide a device or unit adapted to function as an outlet box which is so constructed as to accommodate standard wiring devices and meet practically every requirement as a body for fixtures and other devices and as an outlet for electric wiring in a conduit system, being universal in its adaptability for junction, switch, plug, receptacle, angle or pendant fixtures, and other devices, and for the connection thereto of one or more conduit pipes without change in the unit or the necessity for dismounting the same when a conduit is added or a change is to be made in the fixture or other device carried thereby.

With the above and other ends in view, the invention consists in the matters hereinafter set forth and more particularly pointed out in the appended claims, reference being had to the accompanying drawing in which—

Fig. 1 is a transverse vertical section through a device embodying the invention and illustrating the application thereto of one form of electrical device;

Fig. 2, is a plan view of a box with the cover therefor removed;

Fig. 3, a transverse section of the same;

Fig. 4 is an elevation of the box with a cover applied thereto forming the support and attachment for a hanging fixture;

Fig. 5 is a similar view showing a cover for the attachment of a double fixture;

Fig. 6, a like view showing a cover for the attachment of an angle fixture;

Fig. 7 is an elevation of the box with a plain cover and illustrating the application of an offset fixture or conduit to the box; and Fig. 8 is an elevation of the box with a one way cover applied thereto.

As shown in the drawings, an outlet or junction box 1 comprises a casting formed with a solid bottom 2 and a circular wall 3 having thickened portions in which are formed screw-threaded openings 4, preferably four in number, with a peripheral groove in the outer face of the wall at the outer end of each opening forming a shoulder 5 which serves as a seat for the edge of a convexo-concave sheet metal disk 6 forming a tight closure for each opening, each disk being firmly seated in its opening against the shoulder thereof by pressing the disk inwardly against the shoulder and thus expanding the disk to bring its edge into firm contact with the outer wall of the groove and make a tight joint.

One or more of these disk closures may be easily knocked out when it is desired to use one or more of the openings and as these openings are all screw-threaded, a pipe or other conduit may be screwed in without the necessity for providing the box with a suitable connection or otherwise reforming the opening or pipe, and a water tight joint is secured. It is necessary that the wall of the box be sufficiently thick to provide for screw-threading the openings and this wall is, therefore, preferably thickened where the holes are located and made of less thickness at its intermediate portions for the purpose of lightness and to increase the space within the box.

Screw-threaded openings are also provided in the edge of the wall at the thickened portion thereof to receive screws for detachably holding a suitable cover 8 in place thereon with an interposed gasket 9 to make a tight joint. This cover is formed according to the particular use to which the box is to be put, as when it is used as a body for a plug connection as shown in Fig. 1, said cover is formed with a central opening having an outstanding screw-threaded flange 10 to receive a screw-cap 11 for closing the opening to make the box or body water tight and which cap may be removed to permit the insertion of a plug 12 of a standard type, carried by a screw-cap 13 which is adapted to be screwed into place upon the flange 10 when the plug is inserted, to close the box water tight. The terminals 14 for the plug are mounted in the usual way upon an insulating base 15 which is secured to the bottom of the box in any convenient manner, and thus the box 1 forms a body or casing for any commercial form of plug, the wires being led into the box through one or more pipe conduits (not shown) screwed into the screw threaded openings 4.

The box may also be used as an outlet for the wiring of switches, fixtures and other devices and when used as an outlet and base for a hanging fixture, as shown in Fig. 4, a cover is provided having an axial screw-threaded socket 16 to receive the hollow stem or pipe 17 of the fixture to the lower end of which stem the lamp socket or other device (not shown) is attached in the usual manner.

When the box is used as a base for side wall fixtures or other devices as shown in Figs. 5 to 8 inclusive, covers are provided of a form to suit the particular requirements, there being no change in the box itself whatever. In Fig. 5 a two-way cap is shown in which a tubular portion 18 formed integral with the cover, extends transversely thereof and is screw-threaded at its ends to receive lamp fixtures or other attachments (not shown) of any standard type, and in Fig. 8 a one-way cover is shown having a tubular portion 19 extending radially of the cover and screw-threaded on its outer end to receive a lamp fixture or other attachment (not shown) of any common and well known construction. A side fixture angle bracket is provided as shown in Fig. 6 by forming a cover with an integral axial bent tubular arm 20 having a screw-threaded end to receive the usual fixture (not shown) and in Fig. 7 the box is shown as provided with an off-set tubular pipe or fitting 21 which is screwed into one of the screw-threaded openings 4 in the side of the box for leading the wires away from the wall, and the free end of this pipe may be screw-threaded as shown for the attachment of any suitable fixture, conduit, hanging bracket, or other device (not shown) and one or more of these supporting leads may be used as circumstances may require. When one or more of these side openings are thus employed, a plain tight cover 22 is used, this same cover being employed when the box is used simply as a junction.

This conduit box therefore meets practically every requirement as an outlet for electric wiring in a conduit system and also as a supporting base or casing for junctions, switches, plugs, angle or pendant fixtures, and other devices, as the box serves as a unit which may be made to fill any requirement by merely substituting one for another of the several types of covers and fittings. The box is therefore universal in its application and being so constructed as to be water tight, is particularly adaptable for marine work. Further, this box being provided with a plurality of screw-threaded openings which are sealed water-tight, by closures which are readily removable, possesses all the advantages of a knock-out box and in addition is at all times ready for the immediate application thereto of the desired number of conduits by simply knocking out the disks and screwing in the pipe or other lead, it thus being unnecessary to determine in advance just how many one, two, three or four way boxes may be required for a particular installation, and also making it unnecessary to dismount a box and substitute another therefor when an additional lead or fixture is required and changes from one to another of the several devices such as plug, switch, junction or fixture may just as readily be effected by merely substituting one form of cover for another.

The construction thus obviates the necessity of providing a large assortment of boxes and fixtures as one type of box and a comparatively few interchangeable connecting parts will receive and hold any plain lamp or other fixture at practically any desired angle, and the cost of these combined parts will average less than the cost of made-up combinations, a large assortment of which must be available to meet all requirements and which made up devices must be dismounted and discarded as a whole when a change becomes desirable. A minimum number of parts is thus required to make up a modern installation, and further the box and its parts or attachments are so constructed that any of the standard wiring devices, fixtures and parts may be used and thus when such parts become worn or broken, the repair may be made by substituting any suitable device available in the open market.

Having thus fully described my invention, what I claim is:

1. An outlet box having a thickened wall formed with a screw-threaded opening into which a tubular member is adapted to be screwed, and means for sealing said opening water tight, said means being bodily insertable within the completed opening and having a thickness less than the axial length of the opening, the positioned means being adapted to be knocked out bodily without injury to the thread zone of the opening to expose said zone and permit the member to be screwed to position.

2. An outlet box having a wall formed with thickened portions provided with screw-threaded openings, each opening being formed with a marginal shoulder at its outer end, and a disk secured in each opening against the shoulder, each disk being free from connection with the threads of the opening.

3. An outlet box comprising a cast metal bottom and annular wall, said wall being formed with screw-threaded openings to receive screw-threaded tubular members, and each opening formed with a smooth marginal seat at its outer end, and sheet metal disks expanded within said seats to close the openings, each disk having dimensions to prevent its passage into the threaded zone of an opening.

4. An outlet box comprising a box having a side wall formed with a screw-threaded opening, and means within the outlet end of said opening for closing the same water tight, said means having dimensions to prevent passage thereof into the threaded zone of the opening.

5. An outlet box having a wall formed with screw-threaded openings, and knockout disks closing the outer ends of said openings, each disk having dimensions to prevent its passage into the threaded zone of the opening for which it is serving as the closure.

In testimony whereof I affix my signature in presence of two witnesses.

FRANK J. MINER.

Witnesses:
ANNA M. DORR,
MARY H. SMITH.